(12) United States Patent
Tu et al.

(10) Patent No.: US 12,360,372 B2
(45) Date of Patent: Jul. 15, 2025

(54) AUGMENTED REALITY DISPLAY DEVICE

(71) Applicant: Acer Incorporated, New Taipei (TW)

(72) Inventors: Tsung-Wei Tu, New Taipei (TW);
Yi-Jung Chiu, New Taipei (TW);
Shih-Ting Huang, New Taipei (TW);
Yen-Hsien Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 416 days.

(21) Appl. No.: 17/898,428

(22) Filed: Aug. 29, 2022

(65) Prior Publication Data

US 2023/0194841 A1 Jun. 22, 2023

(30) Foreign Application Priority Data

Dec. 17, 2021 (TW) ................................. 110147555

(51) Int. Cl.
*G02B 27/01* (2006.01)
*G02B 17/00* (2006.01)
*G02B 26/08* (2006.01)

(52) U.S. Cl.
CPC ........ *G02B 27/0172* (2013.01); *G02B 17/002* (2013.01); *G02B 26/0833* (2013.01); *G02B 2027/0123* (2013.01); *G02B 2027/0127* (2013.01)

(58) Field of Classification Search
CPC ............ G02B 27/0172; G02B 26/0833; G02B 17/002; G02B 2027/0123; G02B 2027/0127
See application file for complete search history.

(56) References Cited

U.S. PATENT DOCUMENTS

| 3,936,605 | A | * | 2/1976 | Upton | ................... G02B 27/01 704/271 |
| 5,844,713 | A | * | 12/1998 | Nanba | ................ G02B 27/0172 359/364 |
| 9,958,682 | B1 | | 5/2018 | Moore et al. | |
| 10,768,427 | B2 | | 9/2020 | Ha | |
| 2010/0149073 | A1 | * | 6/2010 | Chaum | .............. G02B 27/0075 345/8 |
| 2018/0252923 | A1 | | 9/2018 | Cakmakci et al. | |
| 2019/0064526 | A1 | * | 2/2019 | Connor | ................ G02B 6/0073 |

(Continued)

FOREIGN PATENT DOCUMENTS

| CN | 109425985 | 3/2019 |
| CN | 110187506 | 8/2019 |

(Continued)

*Primary Examiner* — Nicholas R. Pasko
(74) *Attorney, Agent, or Firm* — JCIPRNET (57) ABSTRACT

An augmented reality display device is used to provide an augmented reality image to one eye of a user. The augmented reality display device includes a curved eyepiece, multiple first micromirrors and two first displays. These first micromirrors are disposed on the curved eyepiece. The two first displays are respectively disposed on two opposite sides of the curved eyepiece. Each first display is for emitting a first image beam. These first micromirrors are for imaging two first image beams emitted by the two first displays onto a retina of the eye to form the augmented reality image. Among them, the horizontal field of view formed by these first micromirrors to the eyes falls within the range of 80 degrees to 110 degrees.

18 Claims, 6 Drawing Sheets

(56) References Cited

U.S. PATENT DOCUMENTS

| | | | | |
|---|---|---|---|---|
| 2019/0096136 A1* | 3/2019 | Yuan | ................. | G06T 19/006 |
| 2019/0259213 A1* | 8/2019 | Yuan | ................. | G06F 3/013 |
| 2020/0026084 A1* | 1/2020 | Kwon | ................. | G02B 3/0037 |
| 2020/0183152 A1* | 6/2020 | Pennell | ................. | G02B 27/141 |
| 2020/0264436 A1* | 8/2020 | Wang | ................. | G02B 27/0075 |
| 2022/0082836 A1* | 3/2022 | Qin | ................. | G02B 27/1066 |
| 2022/0350149 A1* | 11/2022 | Xu | ................. | G06T 19/006 |

FOREIGN PATENT DOCUMENTS

| | | | |
|---|---|---|---|
| CN | 112882229 | 6/2021 | |
| TW | 201928445 | 7/2019 | |
| TW | 202012993 | 4/2020 | |
| TW | 202113429 | 4/2021 | |
| WO | 2019157987 | 8/2019 | |
| WO | WO-2020062124 A1 * | 4/2020 | ......... G02B 27/0101 |

* cited by examiner

AUGMENTED REALITY DISPLAY DEVICE

CROSS-REFERENCE TO RELATED APPLICATION

This application claims the priority benefit of Taiwan application Ser. No. 110147555, filed on Dec. 17, 2021. The entirety of the above-mentioned patent application is hereby incorporated by reference herein and made a part of this specification.

BACKGROUND

Technical Field

The disclosure relates to a display device, and more particularly to an augmented reality display device.

Description of Related Art

Advances in display technologies have brought about gradual developments of virtual reality (VR) display technologies and augmented reality (AR) display technologies. In conventional VR or AR display technologies, different images with viewing angle difference are respectively projected onto a left eye and a right eye, with the left eye and the right eye respectively focusing on different planes to generate stereoscopic vision. However, research at present has pointed out that although the stereoscopic vision can generate a three-dimensional sensation, human eyes still focus on positions on different planes with the same depth, which is not the same as the visual effect by human eyes focusing on positions with different depths of a three-dimensional object in a real space. Therefore, this phenomenon, called vergence-accommodation conflict, serves as one of the reasons why conventional VR or AR displays may cause dizziness of some users.

In order to solve the vergence-accommodation conflict, one of the conventional technologies uses pinhole mirrors to reflect image beams to human eyes and achieves the effect of a deep depth of field via pinhole imaging technologies. In this way, the relatively wide range of a focal distance of human eyes makes the distance from where lines of sight of both eyes converge the same as the focal distance of human eyes, thereby solving the vergence-accommodation conflict effectively. However, in the conventional technologies, the pinhole mirrors are arranged on a plane, which cannot achieve a sufficiently large field of view. In addition, as a larger viewing angle corresponds to an increased number of pinhole mirrors, which results in a longer range of the horizontal arrangement of the pinhole mirrors, an AR display using the pinhole mirrors thus becomes excessively bulky.

SUMMARY

The disclosure provides an augmented reality display device, which has a large field of view with good space utilization.

An embodiment of the disclosure provides an augmented reality display device for providing an augmented reality image to an eye of a user. The augmented reality display device includes a curved eyepiece, multiple first micromirrors, and two first displays. These first micromirrors are disposed on the curved eyepiece. The two first displays are respectively disposed on two opposite sides of the curved eyepiece. Each first display is for emitting a first image beam. These first micromirrors are for imaging two first image beams emitted by the two first displays onto a retina of the eye to form the augmented reality image. A horizontal field of view formed by these first micromirrors for the eye ranges from 80 degrees to 110 degrees, and for some of these first micromirrors, a first micromirror of a different group is irradiated by a first image beam provided by a different first display.

In the augmented reality display device of the embodiments of the disclosure, the curved eyepiece is used, and the field of view formed by these first micromirrors for the eye ranges from of 80 degrees to 110 degrees, and for some of these first micromirrors, a first micromirror of a different group is irradiated by a first image beam provided by a different first display. Therefore, the augmented reality display device has a large field of view with good space utilization and thus may achieve a relatively large field of view with a relatively small volume.

DESCRIPTION OF THE EMBODIMENTS

Figure 1A:
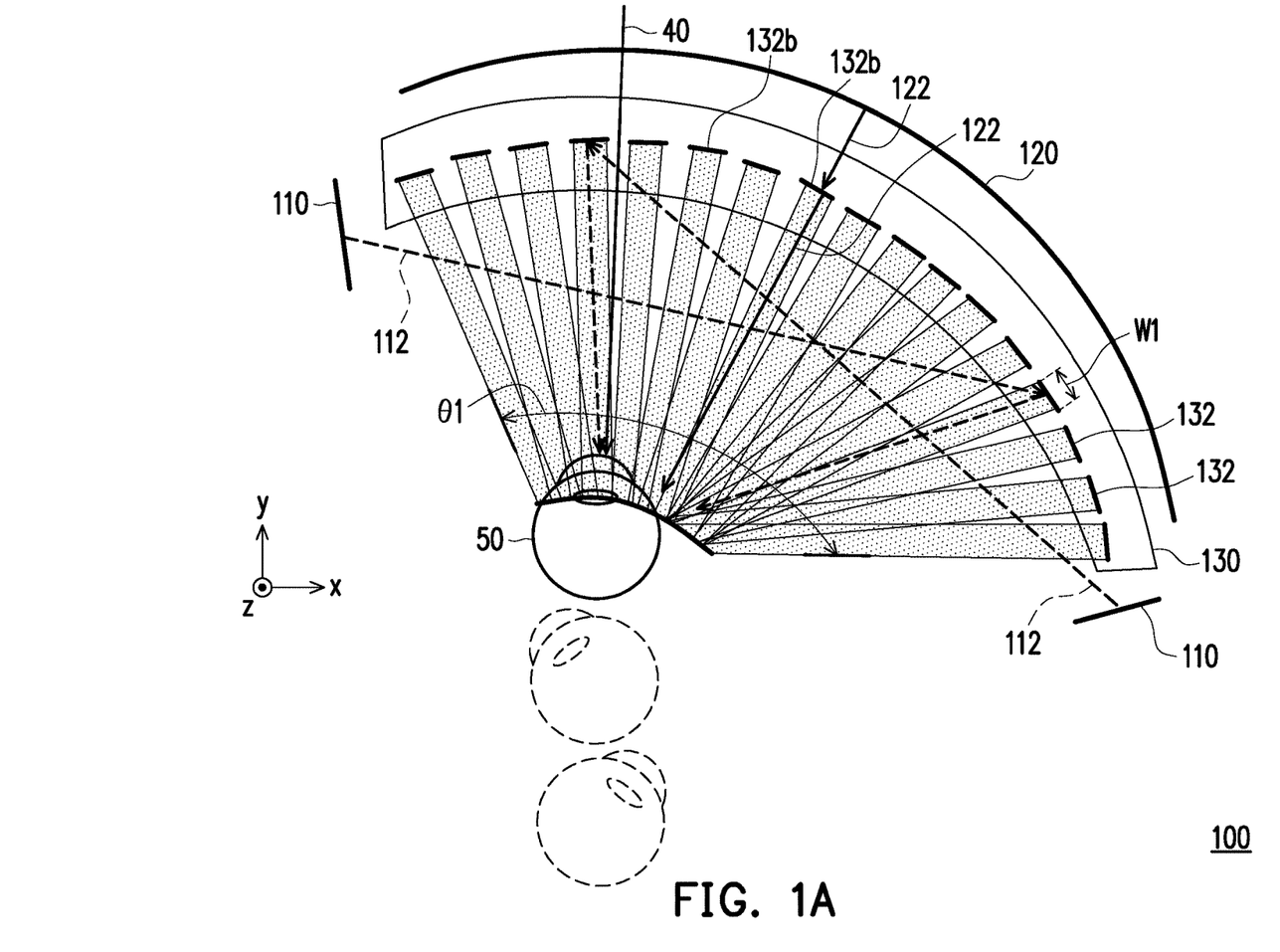
FIG. 1A is a schematic top view of an augmented reality display device according to an embodiment of the disclosure.
Figure 1B:
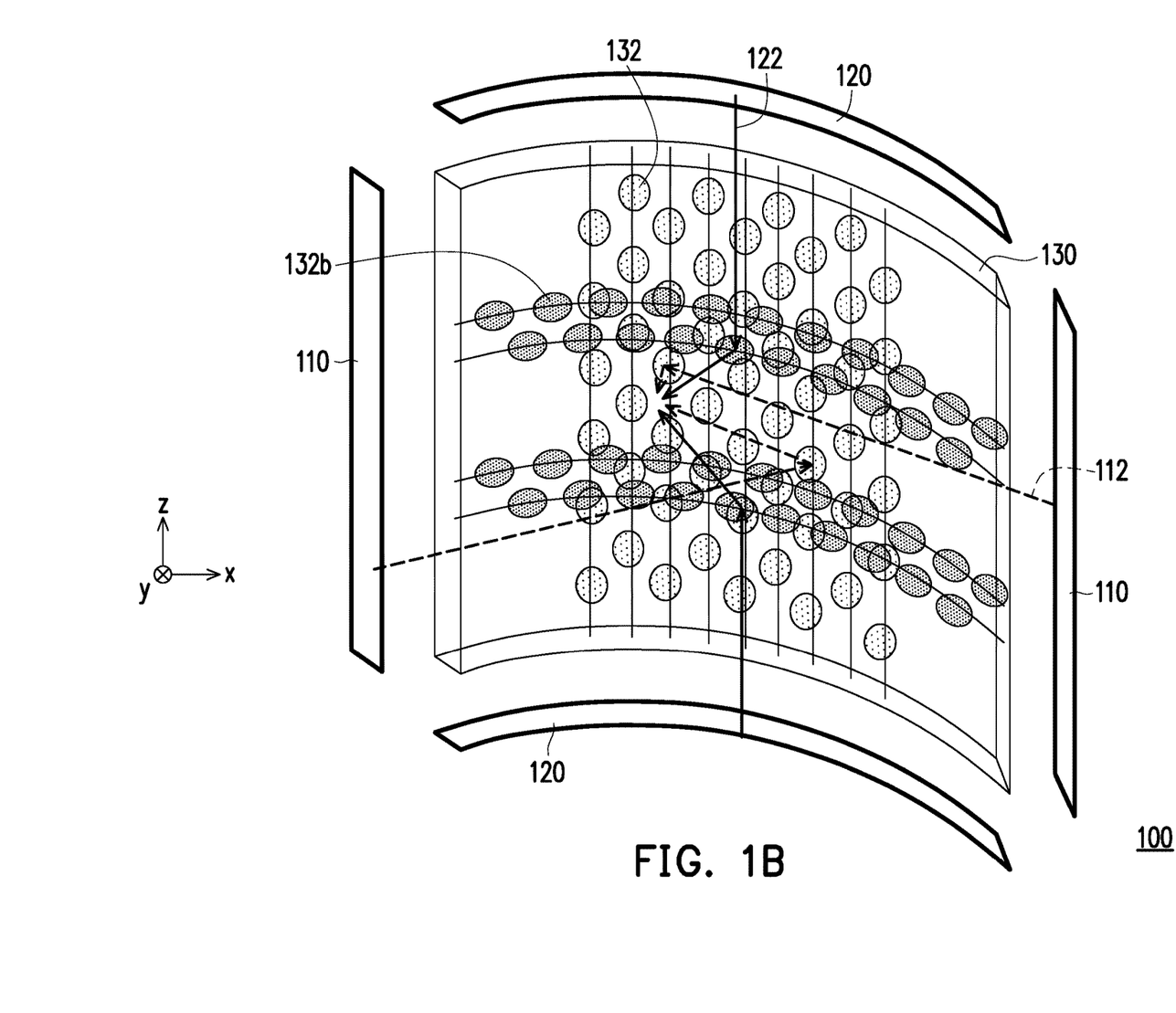
FIG. 1B is a schematic perspective view of the augmented reality display device of FIG. 1A.

FIG. 1A is a schematic top view of an augmented reality display device according to an embodiment of the disclosure, and FIG. 1B is a schematic perspective view of the augmented reality display device of FIG. 1A. With reference to FIG. 1A and FIG. 1B, an augmented reality display device 100 of this embodiment is for providing an augmented reality image to an eye 50 of a user. The augmented reality display device 100 includes a curved eyepiece 130, multiple first micromirrors 132, and two first displays 110. These first micromirrors 132 are disposed on the curved eyepiece 130. In this embodiment, the curved eyepiece 130 is made of, for example, a transparent material, and the transparent material is, for example, plastic or glass. The first micromirrors 132 may be located inside the curved eyepiece 130 and encapsulated by the transparent material as shown in FIG. 1A. Alternately, in other embodiments, the first micromirrors 132 may also be located on the surface of the curved eyepiece 130, such as the surface of the curved eyepiece 130 facing the eye 50 or the surface of the curved eyepiece 130 facing away from the eye 50. In this embodiment, a width W1 of each first micromirror 132 is less than the diameter of a pupil of the eye 50 (such as less than 4 mm). For example, the width of each first micromirror 132 in each direction is less than the diameter of the pupil (such as less than 4 mm), meaning that each first micromirror 132 is, for example, one pinhole mirror.

The two first displays 110 are respectively disposed on two opposite sides of the curved eyepiece 130. Each first display 110 is for emitting a first image beam 112. These first micromirrors 132 are for imaging two first image beams 112 emitted by the two first displays 110 onto a retina of the eye 50 to form the augmented reality image. A horizontal field of view θ1 formed by these first micromirrors 132 for the eye 50 ranges from 80 degrees to 110 degrees, and the horizontal field of view θ1 is, for example, a field of view expanded on an xy plane, where an x direction is parallel to the direction of connecting two eyes 50 of the user, a y direction is the direction directly in front of the user's head, and a z direction is the direction from the user's neck to the top of the head. The x direction, the y direction, and the z direction are perpendicular to each other. In an embodiment, the horizontal field of view θ1 formed by these first micromirrors 132 for the eye 50 ranges from 90 degrees to 110 degrees. FIG. 1A shows one augmented reality display device 100 in front of the user's right eye as an example. In actual use, one augmented reality display device 100 may be respectively disposed in front of the user's right eye and left eye. The augmented reality display device 100 disposed in front of the left eye has internal elements whose arrangements and shapes are mirror symmetric (i.e., left-right symmetric) to those in the augmented reality display device 100 disposed in front of the right eye as shown in FIG. 1A. In this case, relative to the user's eyes, the horizontal field of view reached by the two augmented reality display devices 100 together may range from 160 degrees to 220 degrees or range from, for example, 180 degrees to 220 degrees in an embodiment.

In addition, for some of these first micromirrors 132, the first micromirror 132 of a different group is irradiated by the first image beam 112 provided by the different first display 110. Specifically, in this embodiment, the two first displays 110 are respectively disposed on the left side and the right side of the curved eyepiece 130, where the left side and the right side are relative to the eye 50 of the user. A group of the first micromirrors 132 near the left end of the curved eyepiece 130 are irradiated by the first image beam 112 provided by the first display 110 on the right side, reflecting the first image beam 112 to the eye 50. A group of the first micromirrors 132 near the right end of the curved eyepiece 130 are irradiated by the first image beam 112 provided by the first display 110 on the left side, reflecting the first image beam 112 to the eye 50.

In this embodiment, since these first micromirrors 132 are pinhole mirrors scattered and disposed on the curved eyepiece 130, a virtual image may be formed in front of the eye 50 of the user, and the pinhole mirrors may effectively enhance the depth of field of this virtual image, thereby effectively solving the vergence-accommodation conflict. In addition, since these first micromirrors 132 are scattered on the curved eyepiece 130, the space of the field of view of the eye 50 may be effectively utilized to achieve the large horizontal field of view θ1.

In addition, light 40 from the outside may penetrate the curved eyepiece 130 and be transmitted to the eye 50. In this way, the eye 50 of the user may see the external scenery and the virtual image formed by the first display 110 at the same time, and the augmented reality effect is thus achieved.

In the augmented reality display device 100 of this embodiment, the curved eyepiece 130 is used, and the field of view formed by these first micromirrors for the eye ranges from of 80 degrees to 110 degrees, and for some of these first micromirrors 132, the first micromirror 132 of a different group is irradiated by the first image beam 112 provided by the different first display 110. Therefore, the augmented reality display device 100 has a large field of view with good space utilization and thus may achieve a relatively large field of view with a relatively small volume.

In this embodiment, the augmented reality display device 100 further includes multiple second micromirrors 132b and two second displays 120. These second micromirrors 132b are disposed on the curved eyepiece 130, and these second micromirrors 132b, like the first micromirrors 132, may be disposed in the transparent material of the curved eyepiece 130 or be disposed on the surface of the transparent material of the curved eyepiece 130. In this embodiment, the width of each second micromirror 132b is less than the diameter of the pupil of the eye 50 (such as less than 4 mm). For example, the width of each second micromirror 132b in each direction is less than the diameter of the pupil (such as less than 4 mm), meaning that each second micromirror 132b is, for example, one pinhole mirror.

The two second displays 120 are respectively disposed on another two opposite sides of the curved eyepiece 130, such as being respectively disposed on the upper side and the lower side of the curved eyepiece 130, where the upper side and the lower side are relative to the eye 50 of the user. Each second display 120 is for emitting a second image beam 122, and these second micromirrors 132b are for imaging two second image beams 122 emitted by the two second displays 120 onto the retina of the eye 50 to form the augmented reality image.

In this embodiment, for some of these second micromirrors 132b, the second micromirror 132b of a different group is irradiated by the second image beam 122 provided by the different second display 120. For example, in this embodiment, the group of the second micromirrors 132b near the upper end of the curved eyepiece 130 are irradiated by the second image beam 122 emitted by the second display 120 on the upper side, reflecting this second image beam 122 to the eye 50; on the other hand, the group of the second micromirrors 132b near the lower end of the curved eyepiece 130 are irradiated by the second image beam 122 emitted by the second display 120 on the lower side, reflecting this second image beam 122 to the eye 50. This embodiment adopts the second displays 120 located on the upper and lower sides to enhance the vertical field of view (i.e., the field of view expanded on a yz plane) of the augmented reality display device 100.

In this embodiment, the curved eyepiece 130 is bent in one dimension, namely being bent on the xy plane but being straight and not bent on the yz plane. The arrangements of the first micromirrors 132 and the second micromirrors 132b are also distributed in a curve in one dimension. However, in another embodiment, the curved eyepiece 130 may be bent in two dimensions, namely being bent on the xy plane and on the yz plane. The arrangements of the first micromirrors 132 and the second micromirrors 132b are also distributed in curves in two dimensions. In this embodiment, since the first micromirror 132 and the second micromirror 132b are arranged in curves and may surround the lateral sides of the eye 50 or even the backward of the lateral sides, the relatively large horizontal field of view θ1 may be achieved.

Since the eye 50 moves, the first image beam 112 and the second image beam 122 incident to the eye 50 are adjusted in accordance with the pupil position after the movement of the eye. An image on the outer side (ear side) is transmitted by the first micromirrors 132 and the second micromirrors 132b on the outer side, an image in the front is transmitted by the first micromirrors 132 and the second micromirrors 132b in the front, and an image on the inner side (nose side) is transmitted by the first micromirrors 132 and the second micromirrors 132b on the inner side.

In this embodiment, the two first image beams 112 have a first polarization direction (such as a P polarization direction), and the two second image beams 122 have a second polarization direction (such as an S polarization direction). The first micromirrors 132 are adapted for reflecting light with the first polarization direction and adapted for allowing light with the second polarization direction to penetrate, which means the first micromirrors 132 are adapted for reflecting the first image beam 122 and adapted for allowing the second image beam 122 to penetrate. The second micromirrors 132b are adapted for reflecting the light with the second polarization direction and adapted for allowing the light with the first polarization direction to penetrate, which means the second micromirrors 132b are adapted for reflecting the second image beam 122 and adapted for allowing the first image beam 122 to penetrate. Therefore, the positions on the curved eyepiece 130 where the first micromirrors 132 and the second micromirrors 132b are disposed may overlap or partially overlap. In other embodiments, the first polarization direction may be the S polarization direction, and the second polarization direction may be the P polarization direction. In other words, the first micromirrors 132 and the second micromirrors 132b may be polarization beam splitters. In other embodiments, the first micromirrors 132 and the second micromirrors 132b may also be mirrors that perform partial penetration and partial reflection, such as transflective mirrors.

In this embodiment, the first display 110 and the second display 120 are, for example, liquid crystal displays, organic light emitting diode displays, or other suitable displays. If the first display 110 and the second display 120 are liquid crystal displays, the light emitted by the liquid crystal displays already has a polarization direction, so the configuration of the liquid crystal displays may be adjusted to make the first image beam 112 emitted by the first display 110 have the first polarization direction and make the second image beam 122 emitted by the second display 120 have the second polarization direction. If the first display 110 and the second display 120 are organic light emitting diode displays, the light emitting surfaces of the displays may be disposed with polarizing plates to make the first image beam 112 emitted by the first display 110 have the first polarization direction and make the second image beam 122 emitted by the second display 120 have the second polarization direction.

Figure 2:
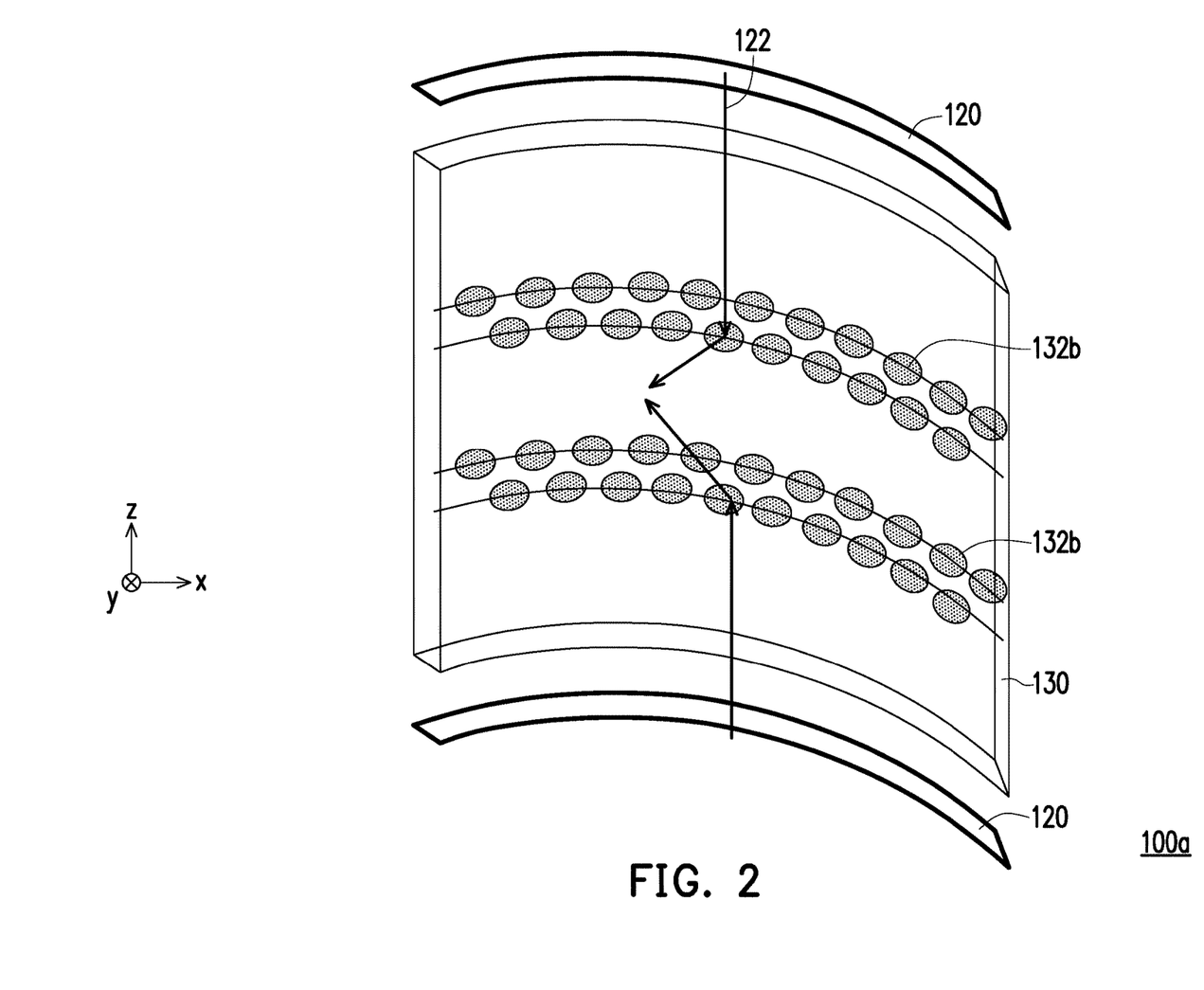
FIG. 2 is a schematic perspective view of an augmented reality display device according to another embodiment of the disclosure.

FIG. 2 is a schematic perspective view of an augmented reality display device according to another embodiment of the disclosure. With reference to FIG. 2, an augmented reality display device 100a of this embodiment is similar to the augmented reality display device 100 of FIG. 1A and FIG. 1B, with the difference between the two described below. Compared with the augmented reality display device 100 in FIG. 1A and FIG. 1B, the augmented reality display device 100a of this embodiment has the second displays 120 but does not have the first displays 110 as in FIG. 1B, and the augmented reality display device 100a has the second micromirrors 132b but does not have the first micromirrors 132 as in FIG. 1B. In this way, by disposing the second displays 120 on the upper and lower sides (which may also be referred to as the two first displays disposed on the upper and lower sides), a virtual image may be formed for the eye 50 with a large horizontal field of view. In this embodiment, the second micromirrors 132b may be general mirrors instead of polarization beam splitters.

Figure 3:
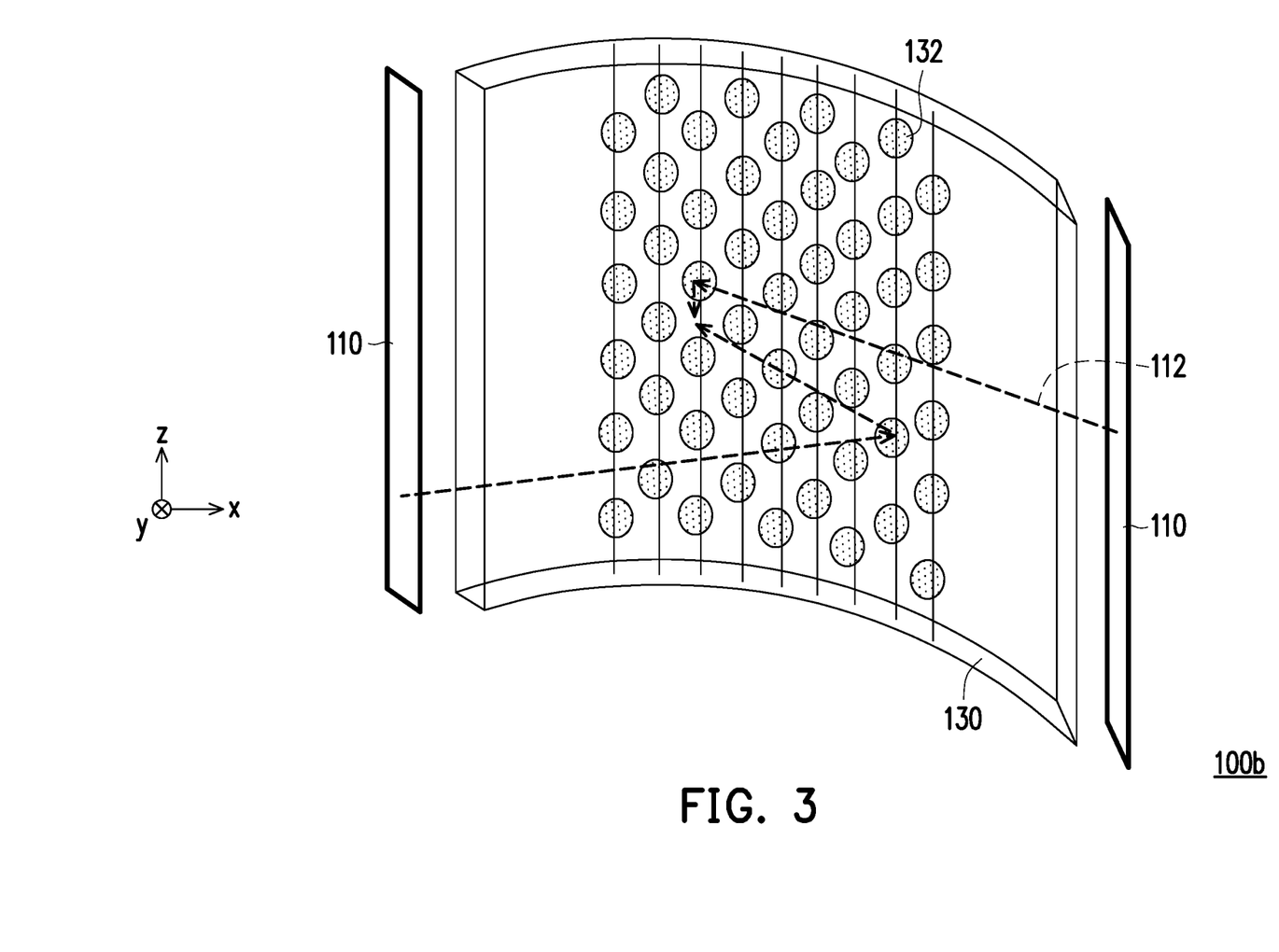
FIG. 3 is a schematic perspective view of an augmented reality display device according to yet another embodiment of the disclosure.

FIG. 3 is a schematic perspective view of an augmented reality display device according to yet another embodiment of the disclosure. With reference to FIG. 3, an augmented reality display device 100b of this embodiment is similar to the augmented reality display device 100 of FIG. 1A and FIG. 1B, with the difference between the two described below. Compared with the augmented reality display device 100 in FIG. 1A and FIG. 1B, the augmented reality display device 100b of this embodiment has the first displays 110 but does not have the second displays 120 as in FIG. 1B, and the augmented reality display device 100b has the first micromirrors 132 but does not have the second micromirrors 132b as in FIG. 1B. In this way, by disposing the first displays 110 on the left and right sides, a virtual image may be formed for the eye 50 with a large horizontal field of view. In this embodiment, the first micromirrors 132 may be general mirrors instead of polarization beam splitters.

Figure 4:
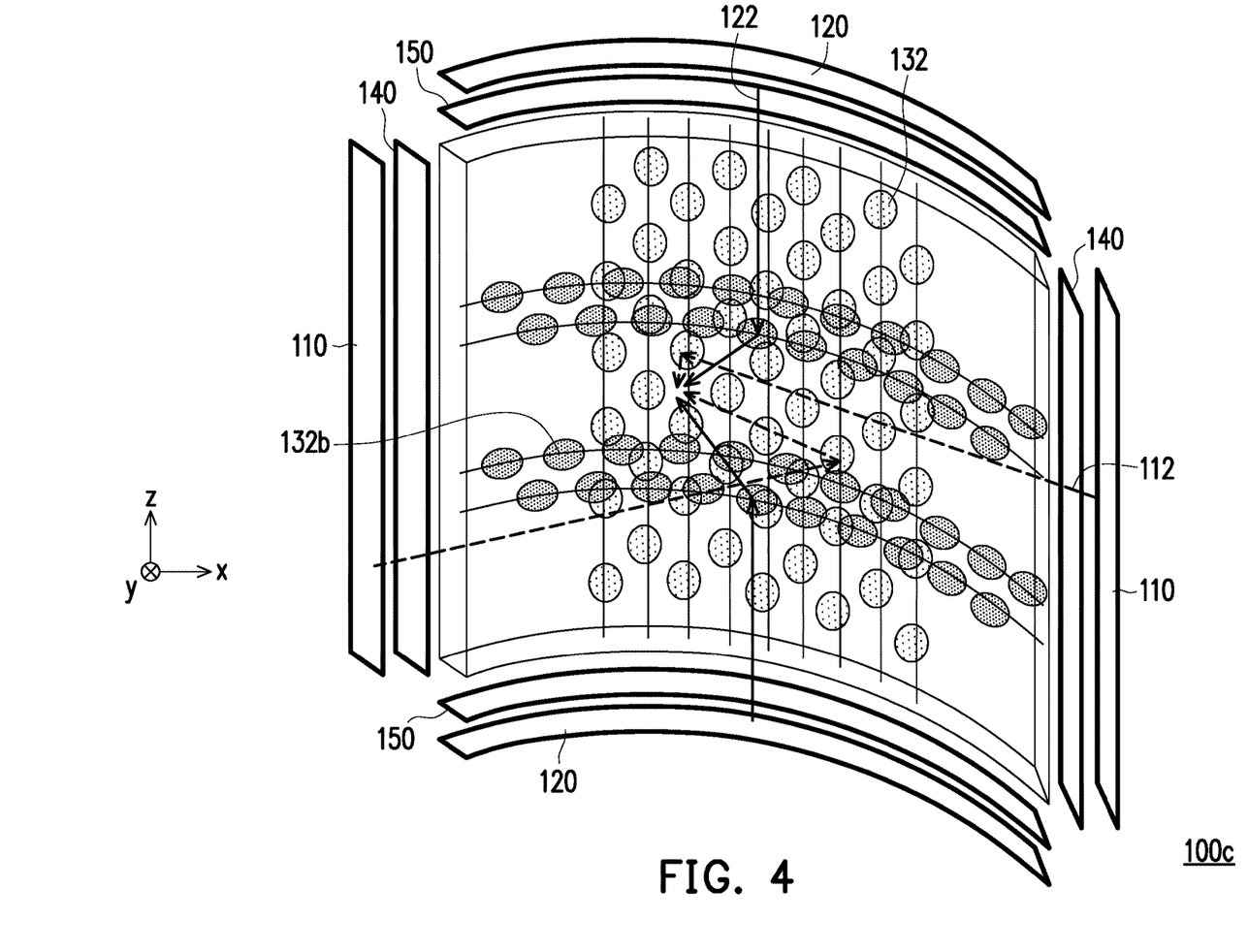
FIG. 4 is a schematic perspective view of an augmented reality display device according to still another embodiment of the disclosure.

FIG. 4 is a schematic perspective view of an augmented reality display device according to still another embodiment of the disclosure. With reference to FIG. 4, an augmented reality display device 100c of this embodiment is similar to the augmented reality display device 100 of FIG. 1A and FIG. 1B, with the difference between the two described below. The augmented reality display device 100c of this embodiment further includes two first optical elements 140 and two second optical elements 150. Each first optical element 140 is disposed between an adjacent first display 110 and the curved eyepiece 130 and is located on the transmission path of a first image beam 112 emitted by the adjacent first display 110. Each second optical element 150 is disposed between an adjacent second display 120 and the curved eyepiece 130 and is located on the transmission path of a second image beam 122 emitted by the adjacent second display 120. In this embodiment, the two first optical elements 140 and the two second optical elements 150 are lenses with smooth surfaces, freeform surface lenses, or Fresnel lenses, which may extend the image distance of the virtual image generated by the first displays 110 and the second displays 120 for the eye 50 and help human eyes view the image in a relatively comfortable way. On the other hand, the size of the first displays 110 and the second displays 120 may also be reduced under the premise of achieving the same size of the virtual image. Alternately, in other embodiments, the two first optical elements 140 and the two second optical elements 150 may also be polarizers (i.e., polarizing plates) or wave plates, and the wave plates are, for example, half-wave plates or quarter-wave plates. In addition, in another embodiment, the two second optical elements 150 may also be applied to the augmented reality display device 100a in FIG. 2. Furthermore, in another embodiment, the two first optical elements 140 may also be applied to the augmented reality display device 100b in FIG. 3.

Figure 5:
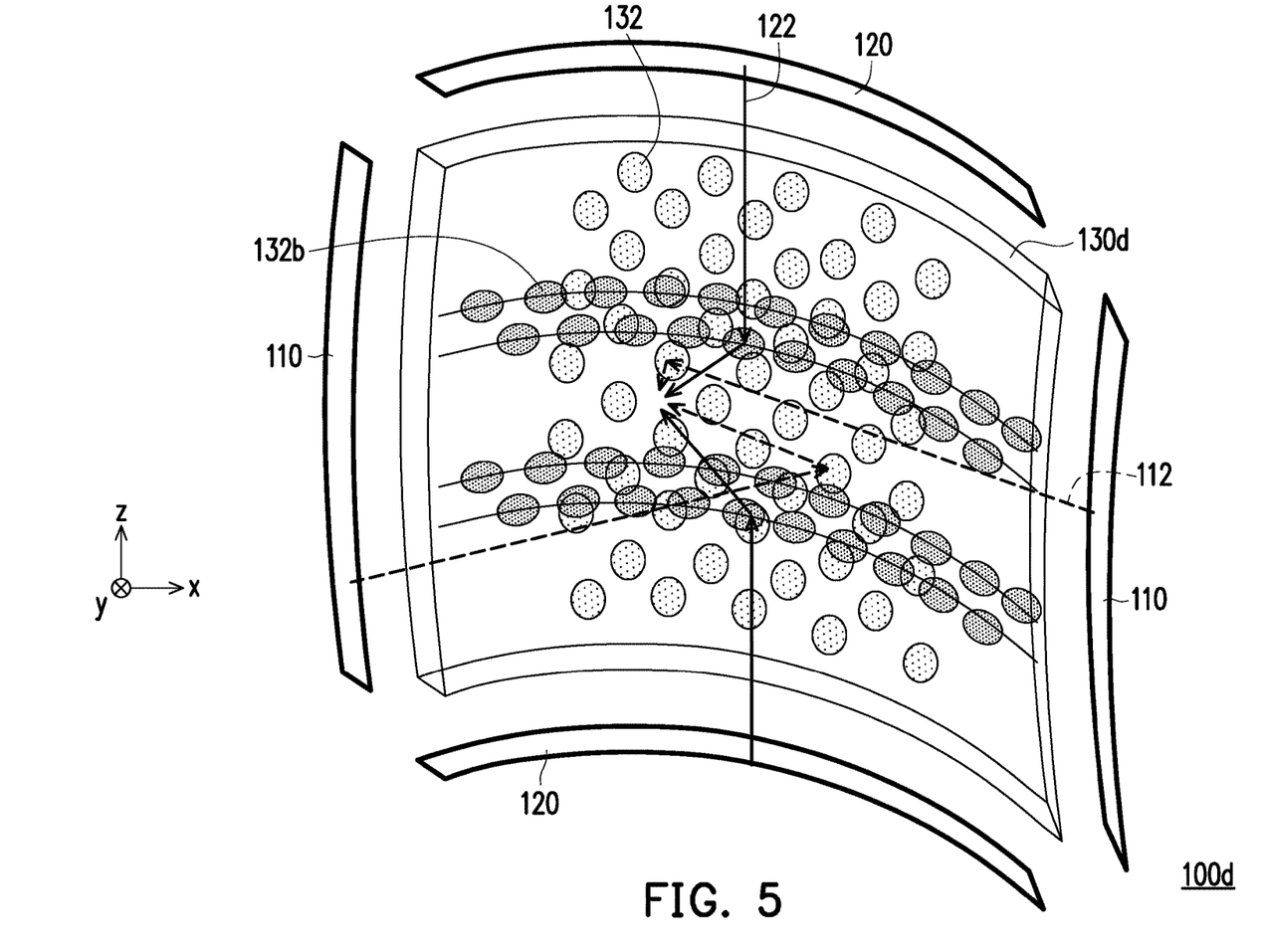
FIG. 5 is a schematic perspective view of an augmented reality display device according to another embodiment of the disclosure.

FIG. 5 is a schematic perspective view of an augmented reality display device according to another embodiment of the disclosure. With reference to FIG. 5, an augmented reality display device 100d of this embodiment is similar to the augmented reality display device 100 of FIG. 1A and FIG. 1B. The difference between the two is that in the augmented reality display device 100d of this embodiment, a curved eyepiece 130d may be bent in two dimensions, namely being bent on the xy plane and on the yz plane, and the first micromirrors 132 and the second micromirrors 132b are also distributed in curves in two dimensions.

In summary, in the augmented reality display device of the embodiments of the disclosure, with the curved eyepiece, the field of view formed by these first micromirrors for the eye ranges from of 80 degrees to 110 degrees, and for some of these first micromirrors, a first micromirror of a different group is irradiated by a first image beam provided by a different first display. Therefore, the augmented reality display device has a large field of view with good space utilization and thus may achieve a relatively large field of view with a relatively small volume.

What is claimed is:

1. An augmented reality display device, for providing an augmented reality image to an eye of a user, the augmented reality display device comprising:
    a curved eyepiece;
    a plurality of first micromirrors, disposed on the curved eyepiece; and
    two first displays, respectively disposed on two opposite sides of the curved eyepiece, each of the two first displays for emitting a first image beam, and the plurality of first micromirrors for imaging first image beams emitted by the two first displays onto a retina of the eye to form the augmented reality image, wherein
    a horizontal field of view formed by the plurality of first micromirrors for the eye ranges from 80 degrees to 110 degrees, the first micromirrors comprises a first group of micromirrors adjacent to a first one of the two first displays and a second group of micromirrors adjacent to a second one of the two first displays, the first image beam emitted from the first one of the two first displays is reflected by the second group of micromirrors to the eye, and the first image beam emitted from the second one of the two first displays is reflected by the first group of micromirrors to the eye.

2. The augmented reality display device according to claim 1, wherein the curved eyepiece is bent in one dimension.

3. The augmented reality display device according to claim 1, wherein the curved eyepiece is bent in two dimensions.

4. The augmented reality display device according to claim 1, wherein a width of each of the plurality of first micromirrors is less than 4 millimeters.

5. The augmented reality display device according to claim 1, wherein the horizontal field of view formed by the plurality of first micromirrors for the eye ranges from 90 degrees to 110 degrees.

6. The augmented reality display device according to claim 1, wherein the two first displays are respectively disposed on an upper side and a lower side of the curved eyepiece, and the upper side and the lower side are relative to the eye of the user.

7. The augmented reality display device according to claim 1, wherein the two first displays are respectively disposed on a left side and a right side of the curved eyepiece, and the left side and the right side are relative to the eye of the user.

8. The augmented reality display device according to claim 1, wherein the two first displays are liquid crystal displays or organic light emitting diode displays.

9. The augmented reality display device according to claim 1, wherein the curved eyepiece is made of a transparent material.

10. The augmented reality display device according to claim 9, wherein the transparent material is plastic or glass.

11. The augmented reality display device according to claim 9, wherein the first micromirrors are located inside the curved eyepiece and encapsulated by the transparent material.

12. The augmented reality display device according to claim 1, further comprising:
    a plurality of second micromirrors, disposed on the curved eyepiece; and
    two second displays, respectively disposed on another two opposite sides of the curved eyepiece, each of the two second displays for emitting a second image beam, and the plurality of second micromirrors for imaging second image beams emitted by the two second displays onto the retina of the eye to form the augmented reality image, wherein the second micromirrors comprises a third group of micromirrors adjacent to a first one of the two second displays and a fourth group of micromirrors adjacent to a second one of the two second displays, the second image beam emitted from the first one of the two second displays is reflected by the third group of micromirrors to the eye, and the second image beam emitted from the second one of the two second displays is reflected by the fourth group of micromirrors to the eye.

13. The augmented reality display device according to claim 12, wherein the first image beams have a first polarization direction, the second image beams have a second polarization direction, the plurality of first micromirrors are adapted for reflecting light with the first polarization direction and are adapted for allowing light with the second polarization direction to penetrate, and the plurality of second micromirrors are adapted for reflecting the light with the second polarization direction and are adapted for allowing the light with the first polarization direction to penetrate.

14. The augmented reality display device according to claim 12, wherein a width of each of the plurality of second micromirrors is less than 4 millimeters.

15. The augmented reality display device according to claim 12, wherein the two first displays and the two second displays are liquid crystal displays or organic light emitting diode displays.

16. The augmented reality display device according to claim 12, further comprising:
    two first optical elements, each of the two first optical elements disposed between a first display adjacent to the each of the two first optical elements and the curved eyepiece and located on a transmission path of a first image beam emitted by the first display adjacent to the each of the two first optical elements; and
    two second optical elements, each of the two second optical elements disposed between a second display adjacent to the each of the two second optical elements and the curved eyepiece and located on a transmission path of a second image beam emitted by the second display adjacent to the each of the two second optical elements.

17. The augmented reality display device according to claim 16, wherein the two first optical elements and the two second optical elements are lenses with smooth surfaces, freeform surface lenses, or Fresnel lenses.

18. The augmented reality display device according to claim 16, wherein the two first optical elements and the two second optical elements are polarizers or wave plates.

* * * * *